(12) United States Patent
Wong et al.

(10) Patent No.: US 8,864,111 B2
(45) Date of Patent: Oct. 21, 2014

(54) NATURAL MIST HUMIDIFIER

(75) Inventors: Ying Man John Wong, Shatin (HK); Kwok Yung Anthony Law, Shatin (HK)

(73) Assignee: Raymond Industrial Limited, Shatin (HK)

( * ) Notice: Subject to any disclaimer, the term of this patent is extended or adjusted under 35 U.S.C. 154(b) by 613 days.

(21) Appl. No.: 13/136,181

(22) Filed: Jul. 26, 2011

(65) Prior Publication Data
US 2012/0025408 A1    Feb. 2, 2012

Related U.S. Application Data

(60) Provisional application No. 61/400,544, filed on Jul. 29, 2010.

(51) Int. Cl.
*B01F 3/04*    (2006.01)

(52) U.S. Cl.
USPC ............. 261/26; 261/30; 261/72.1; 261/78.2; 261/81; 261/142; 261/DIG. 48; 261/DIG. 65

(58) Field of Classification Search
CPC .............. B01F 3/04; B01F 3/022; B01F 3/02; B01F 3/04021; B01F 3/0407; A61M 16/16; A61M 16/1045; A61M 16/1075
USPC ............... 261/26, 30, 78.2, 81, 142, DIG. 48, 261/DIG. 65, 72.1
See application file for complete search history.

(56) References Cited

U.S. PATENT DOCUMENTS 6,244,576 B1 *  6/2001  Tsai ............................... 261/141
6,793,205 B2 *  9/2004  Eom ............................. 261/142

* cited by examiner

*Primary Examiner* — Robert A Hopkins
(74) *Attorney, Agent, or Firm* — Alix, Yale & Ristas, LLP

(57) ABSTRACT

A mist humidifier includes a water supply, at least one nebulization device and at least one heater mechanism. The nebulization device nebulizes at least a portion of a flow of water from the water supply and discharges a flow of mist particles. The heater mechanism selectively heats at least a portion of the flow of mist particles.

21 Claims, 5 Drawing Sheets

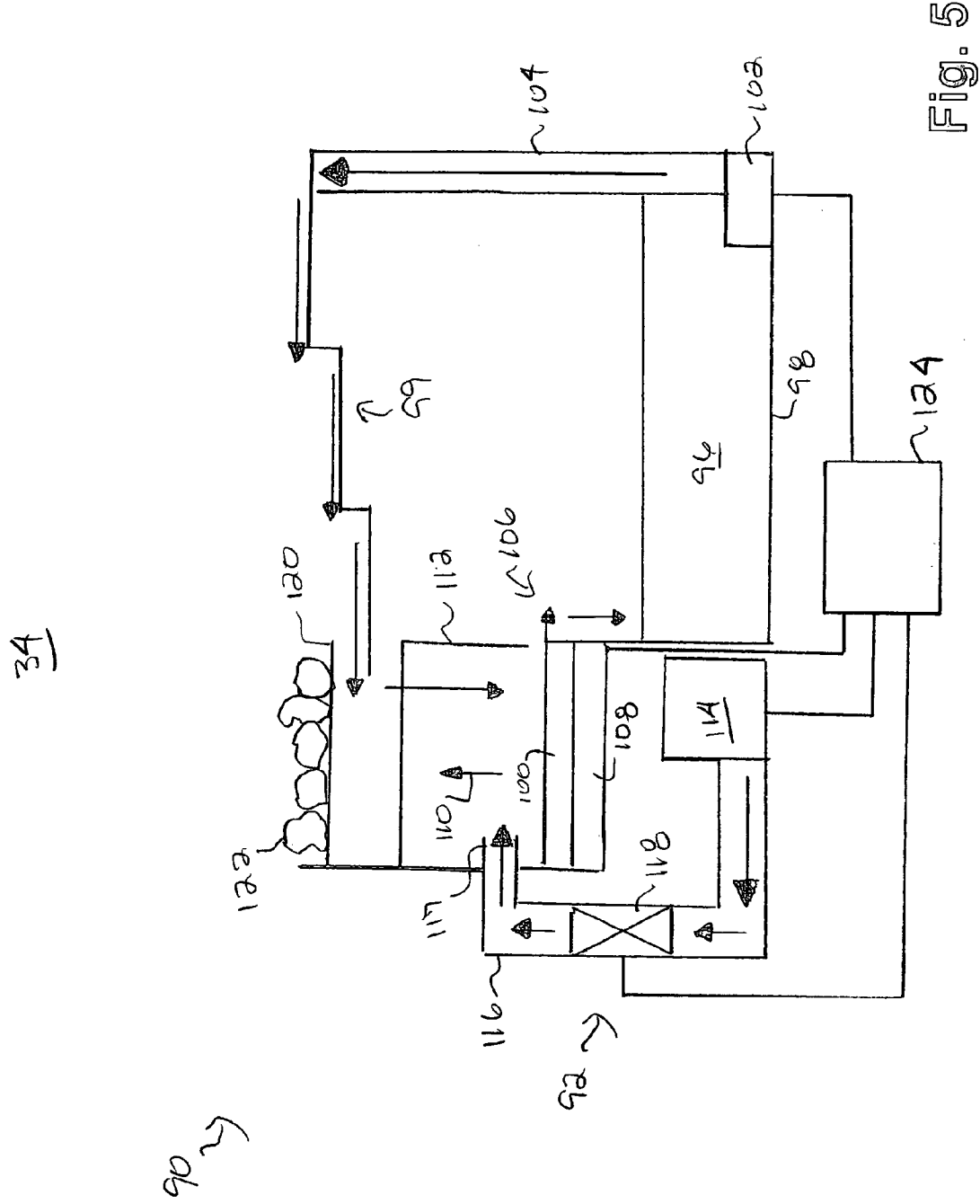

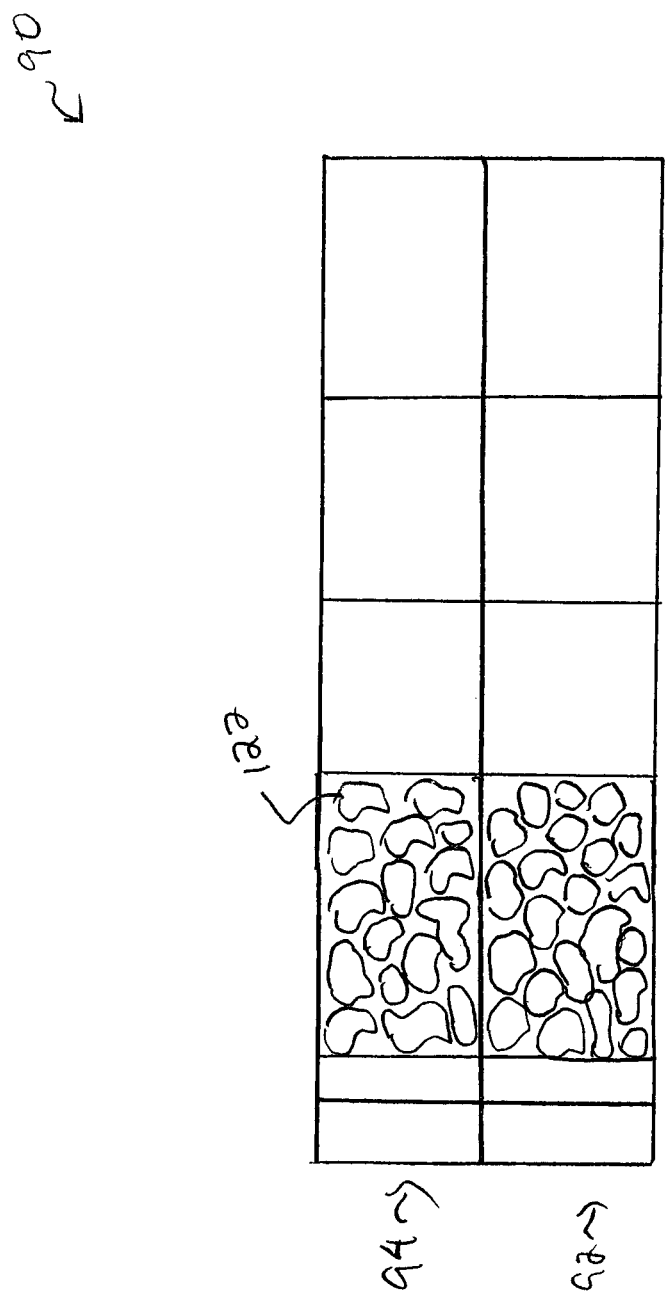

NATURAL MIST HUMIDIFIER

CROSS-REFERENCE TO RELATED APPLICATIONS

This application claims the benefit under 35 U.S.C. §119 (e) of U.S. Provisional Patent Application Ser. No. 61/400,544 filed Jul. 29, 2010.

BACKGROUND

This disclosure relates generally to humidifiers. More particularly, this disclosure relates to humidifiers for increasing the moisture content of the ambient atmosphere.

There are three types of conventional humidifiers. In the first type, a heater mechanism to produce hot steam. This type of humidifier is the most efficient at saturating the ambient atmosphere with moisture and the heater mechanism bacteria from becoming a problem. However, the boiling water produced by the heater mechanism create safety issues if the humidifier is tipped over or hit sufficiently hard to cause the water to spill out of the humidifier.

The second type utilizes forced evaporation to humidify the ambient atmosphere. The forced evaporation mechanism includes a media that may be soaked with water and a fan. The media provides a surface that breaks down the surface tension of water. The motorized fan provides a directional airflow profile that carries away the moisture from the media surface to the ambient atmosphere. The advantage of this system is its simplicity and the saturation rate of moisture in ambient air. However, the relatively stagnant water source and the wetted surface area of the media provide ideal environments for the growth of bacteria. Accordingly, periodic maintenance is required to clean the media and sterilize the water source.

In the third type, a nebulization device breaks the water source into water particles, often with a visually impressive effect. However, the ultra-sonic transducers commonly used as nebulization devices can only produce water particle sizes in the range of 3-5 mm. Since these water particles are relatively large, they do not remain suspended in the air long enough to effectively saturate the ambient atmosphere, the droplets falling out of suspension to cover the surrounding surfaces with moisture.

SUMMARY

There is provided a mist humidifier comprising a water supply, at least one nebulization device and at least one heater mechanism. The nebulization device nebulizes at least a portion of a flow of water from the water supply and discharges a flow of mist particles. The heater mechanism selectively heats at least a portion of the flow of mist particles.

The mist humidifier may further comprise a fan and a flow chamber, where the nebulization device discharges the flow of mist particles into the flow chamber and the fan draws the flow of mist particles from the flow chamber, through the heater mechanism, and discharges the flow of mist particles from the humidifier.

The water supply may comprise a tank forming a primary water supply, a secondary water supply, a pump and a supply line, where water is delivered from the primary water supply to the secondary water supply through the supply line by the pump and water is drawn from the secondary water supply by the nebulization device.

The water supply may also comprise a recycle flow path to carry water from the secondary water supply to the primary water supply.

The mist humidifier may further comprise first and second nebulization assemblies, with each of the nebulization assemblies including one of the nebulization devices.

The heater mechanism may be disposed in the first nebulization assembly and be selectively operable to heat the flow of mist particles.

The mist humidifier may further comprise a fan to blow the flow of mist particles from the first and second nebulization assemblies and from the humidifier.

The mist humidifier may further comprise first and second fans to blow the flow of mist particles from the first and second nebulization assemblies, respectively, and from the humidifier. Each of the nebulization assemblies may also include a flow chamber and an air supply line, with the air supply line of the first nebulization assembly connecting the first fan to the flow chamber of the first nebulization assembly, the air supply line of the second nebulization assembly connecting the second fan to the flow chamber of the second nebulization assembly. The heater mechanism may be disposed in the air supply line of the first nebulization assembly.

The nebulization device may have multiple nebulization locations or the humidifier may include multiple nebulization devices. The heater mechanism may be positioned downstream of one of the nebulization locations or one of the nebulization devices, with a baffle disposed intermediate the heater mechanism and the one of the nebulization locations or the one of the nebulization devices.

BRIEF DESCRIPTION OF THE DRAWINGS

The present disclosure may be better understood and its numerous objects and advantages will become apparent to those skilled in the art by reference to the accompanying drawings in which:

FIG. 5 is a schematic diagram of a fourth embodiment of a mist humidifier in accordance with the disclosure; and FIG. 6 is a top view of the embodiment of FIG. 5.

DETAILED DESCRIPTION

With reference to the drawings wherein like numerals represent like parts throughout the several figures, a mist humidifier in accordance with the present disclosure includes at least one nebulization device, such as an ultrasonic transducer, and at least one heater mechanism, such as a wire heater or a positive temperature coefficient (PTC) heater.

Figure 1:
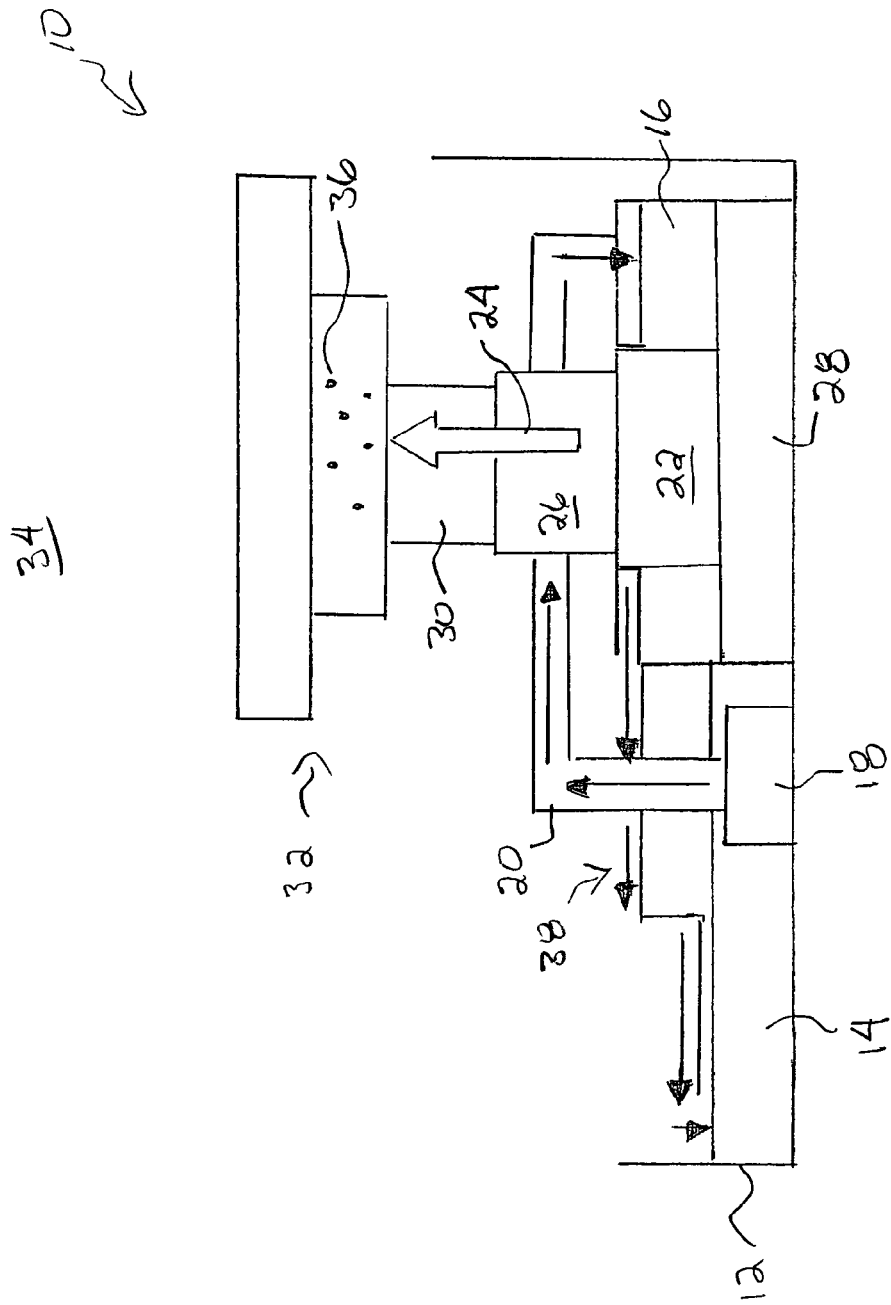
FIG. 1 is a schematic diagram of a first embodiment of a mist humidifier in accordance with the disclosure.

With reference to FIG. 1, a first embodiment of the mist humidifier 10 includes an enclosure forming a tank 12 that holds the primary water supply 14. Water from the primary water supply 14 is delivered to a secondary water supply 16 by way of a pump 18 and a supply line 20. Water is drawn from the secondary water supply 16 into the nebulization chamber of a nebulization device 22, which nebulizes the water and discharges a cool water mist 24 into a flow chamber 26. A fan 28 draws the mist 24 from the flow chamber 26, through a heater mechanism 30, and discharges the mist 24 through an air flow path 32 into the ambient atmosphere 34. If the heater mechanism 30 is energized, the heat generated by the heater mechanism 30 converts the cool mist to a warm mist. In addition, heat absorption by the mist 24 causes evaporation of some of the water mass from the relatively large surface area of the mist particles 36, reducing the size of the mist particles 36 and thereby increasing the ambient atmosphere saturation efficiency of the humidifier 10. If an excess of water is supplied from the primary water supply 14 to the secondary water supply 16, this excess flow returns to the primary water supply by a recycle flow path 38.

Figure 2:
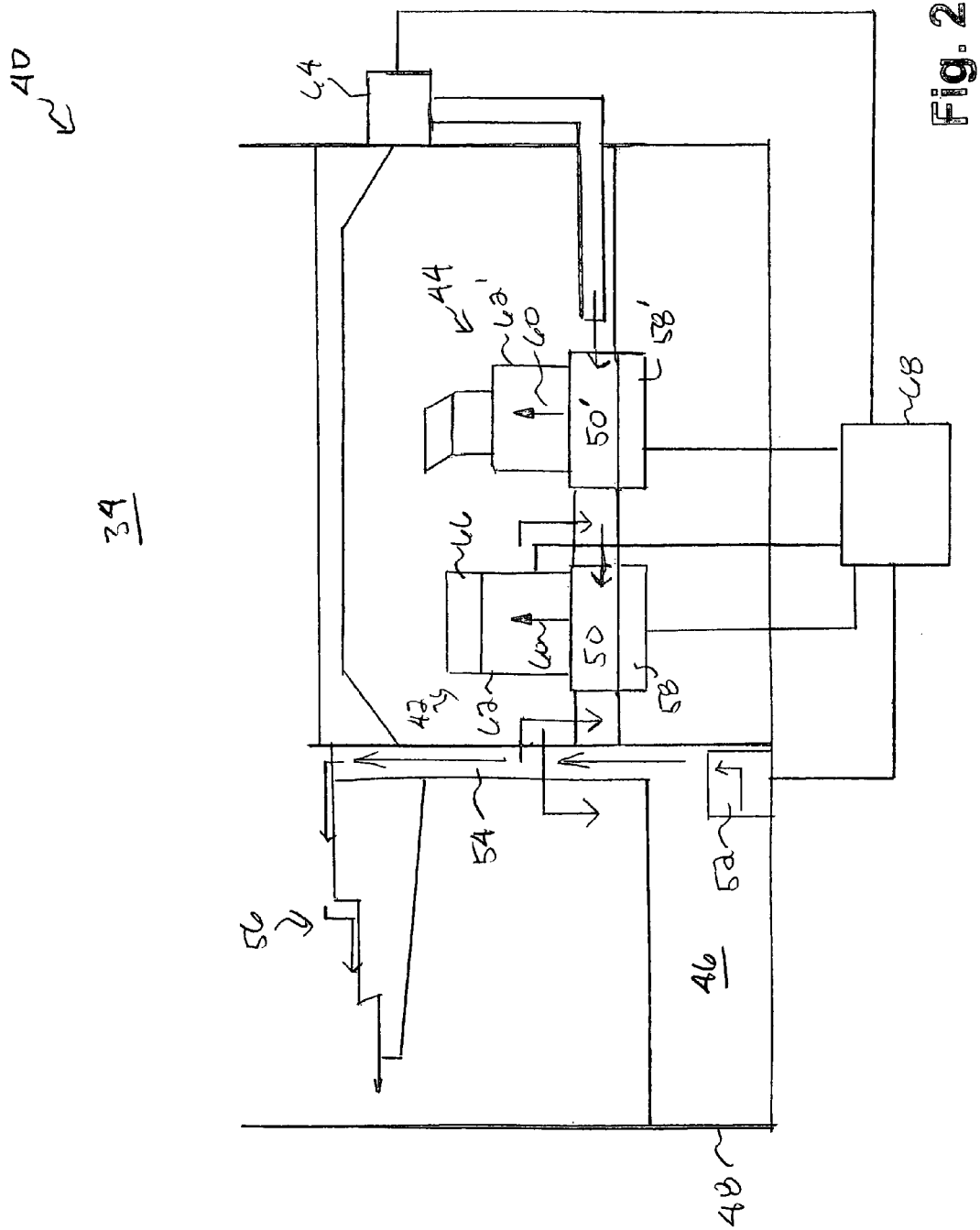
FIG. 2 is a schematic diagram of a second embodiment of a mist humidifier in accordance with the disclosure.

With reference to FIG. 2, a second embodiment of the mist humidifier 40 includes first and second nebulization assemblies 42, 44. Water from a water supply 46 held in a tank 48 is delivered to the water chamber 50, 50' of each nebulization assembly 42, 44 by way of a pump 52 and a supply line 54. If an excess of water is supplied from the water supply 46, this excess flow returns to the water supply by a recycle flow path 56. The nebulization device 58, 58' of each nebulization assembly 42, 44 draws water from the assembly water chamber 50, 50' and discharges a cool water mist 60. The cool water mist is blown through an assembly flow chamber 62, 62' and then into the ambient atmosphere 34.

The mist humidifier 40 may include a single fan 64 for use with both nebulization assemblies 42, 44 or two fans, with one fan associated with each of the nebulization assemblies 42, 44. A heater mechanism 66 is disposed in the flow chamber 62 of the first nebulization assembly 42. If the heater mechanism 66 is energized, the heat generated by the heater mechanism 66 converts the cool mist to a warm mist. In addition, heat absorption by the mist 60 causes evaporation of some of the water mass from the relatively large surface area of the mist particles, reducing the size of the mist particles.

It should be appreciated that the humidifier 40 may be operated in a number of modes. For example, the humidifier 40 may be operated with only a single nebulization assembly 42, 44 in operation or with both nebulization assemblies 42, 44 in operation. The first nebulization assembly 42 may be operated with the heater mechanism 66 energized or de-energized. The humidifier control system 68 allows variable speed operation of the fan(s) 64 and variable heat output operation of the heater mechanism 66. Accordingly, the humidifier 40 may 1) produce cool mist only (second nebulization assembly 44 only; first and second nebulization units 42, 44 with heater mechanism 66 de-energized); 2) produce warm mist only (first nebulization 42 unit only with heater mechanism 66 energized); or 3) produce a mix of cool and warm mist (first and second nebulization units 42, 44 with heater mechanism 66 energized).

Figure 4:
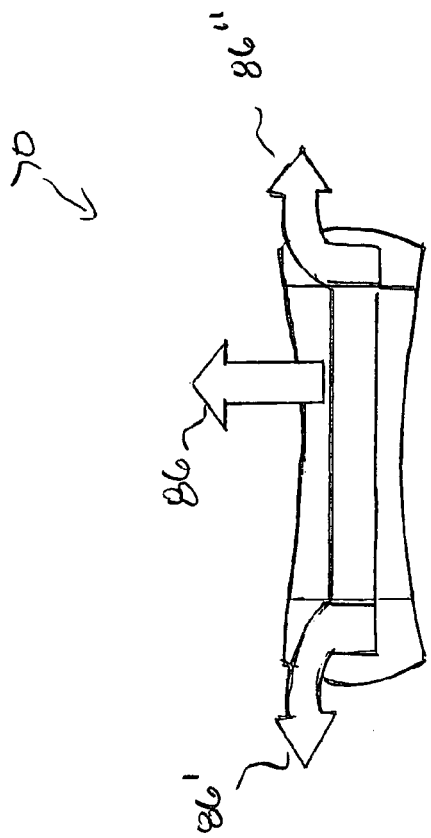
FIG. 4 is a top view of the embodiment of FIG. 3.
Figure 3:
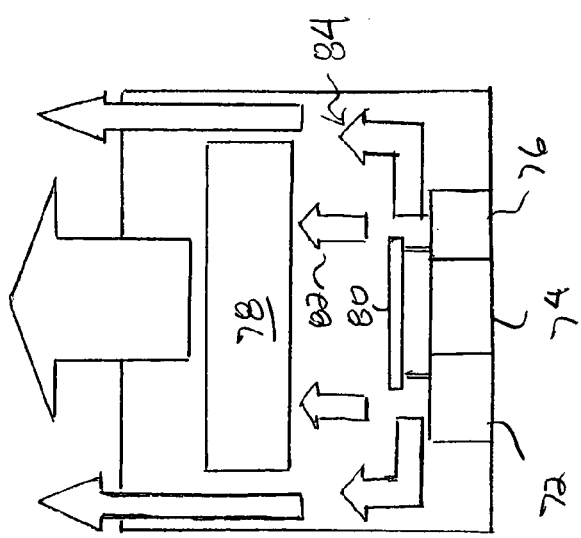
FIG. 3 is a schematic diagram of a third embodiment of a mist humidifier in accordance with the disclosure.

With reference to FIGS. 3 and 4, a third embodiment of the mist humidifier 70 includes either multiple nebulization devices 72, 74, 76 or a single nebulization device capable of nebulizing water at multiple locations, for example a three head ultrasonic transducer. A heater mechanism 78 is positioned above one of the nebulization devices/nebulization locations 74 and a baffle 80, such as a metal sheet, is positioned between the nebulization device/nebulization location 74 and the heater mechanism 78 such that the mist 82 produced by the nebulization device/nebulization location 74 is diverted around the baffle 80 and a portion 84 of the mist 82 produced by the nebulization device/nebulization location 74 is blocked from flowing directly into the heater mechanism 78.

In the embodiment shown in FIGS. 3 and 4, the nebulization devices/nebulization locations 72, 74, 76 are arranged side-by-side with the heater mechanism 78 and the baffle 80 disposed above the center nebulization device/nebulization location 74. In this arrangement, the mist 82 produced by the nebulization devices/nebulization locations 72, 74, 76 exits the humidifier 70 as three distinct flows 86, 86', 86" of mist. While there may be some mixing of mist 82 produced by each of the nebulization devices/nebulization locations 72, 74, 76, the two outer mist streams 86', 86" and the center mist stream 86 exiting the humidifier 70 are predominantly produced by the two outer nebulization devices/nebulization locations 72, 76 and the center nebulization device/nebulization location 74, respectively. Accordingly, the two outer mist streams 86', 86" contain cool mist particles and the center mist stream 86 contains warm mist particles when the heater mechanism 78 is energized or cool mist particles if the heater mechanism 78 is de-energized.

With reference to FIGS. 5 and 6, a fourth embodiment of the mist humidifier 90 is similar to the second embodiment 40, having first and second nebulization assemblies 92, 94. The nebulization device 108 of each nebulization assembly 92, 94 draws water from the assembly water chamber 100 and discharges a cool water mist 110 into a flow chamber 112. Water from a water supply 96 held in a tank 98 is delivered to a stream level 99 disposed above the flow chamber 112 of each nebulization assembly 92, 94 by way of a pump 102 and a supply line 104. The water then falls from the stream level 99 into the water chamber 100 of each nebulization assembly 92, 94. If an excess of water is supplied from the water supply, this excess flow returns to the water supply by a recycle flow path 106.

A fan 114 in each of the nebulization assemblies 92, 94 blows air into the flow chamber 112 via an air supply line 116 and a nozzle 117, forcing the mist 110 from the flow chamber 112 into the ambient atmosphere 34. The nozzle 117 may direct the flow of air either across the surface of the water in the water chamber 100 or towards the surface of the water in the water chamber 100. A heater mechanism 118 is disposed in the air supply line 116 of one of the nebulization assemblies 92, 94. If the heater mechanism 118 is energized, the heat generated by the heater mechanism 118 heats the air, which converts the cool mist in the flow chamber 112 to a warm mist. In addition, heat absorption by the mist 110 causes evaporation of some of the water mass from the relatively large surface area of the mist particles, reducing the size of the mist particles. The humidifier 90 may include a porous tray 120 that supports decorative rocks 122 that make contact with the mist 110 before the mist is discharged.

Similar to the second embodiment 40, the humidifier 90 may be operated in a number of modes. For example, the humidifier 90 may be operated with only a single nebulization assembly 92, 94 in operation or with both nebulization assemblies 92, 94 in operation. The first nebulization assembly 92 may be operated with the heater mechanism 118 energized or de-energized. The humidifier control system 124 allows variable speed operation of the fan(s) 114 and variable heat output operation of the heater mechanism 118. Accordingly, the humidifier 90 may 1) produce cool mist only (second nebulization assembly only 94; first and second nebulization assemblies 92, 94 with heater mechanism 118 de-energized); 2) produce warm mist only (first nebulization assembly 92 only with heater mechanism 118 energized); or 3) produce a mix of cool and warm mist (first and second nebulization assemblies 92, 94 with heater mechanism 118 energized).

The subject humidifier 10, 40, 70, 90 provides a high level of water saturation in air, similar to a conventional steam humidifier, but without creating a potential safety hazard by boiling the water. In addition, the mist emitted from the humidifier 10, 40, 70, 90 provides a visually elegant mist emission effect.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A mist humidifier comprising:
   a water supply adapted to provide a flow of water;
   at least one nebulization device adapted to nebulize at least a portion of the flow of water and discharge a flow of mist particles in a downstream direction;
   at least one heater mechanism adapted to selectively heat at least a portion of the flow of mist particles; and
   first and second nebulization assemblies, each of the nebulization assemblies including one of the nebulization devices.

2. The mist humidifier of claim 1 wherein the water supply comprises:
   a tank;
   a pump; and
   a supply line;
   wherein water is delivered from the tank to the nebulization device of each nebulization assembly through the supply line by the pump.

3. The mist humidifier of claim 2 wherein the water supply also comprises a recycle flow path adapted to carry water from the nebulization assemblies to the tank.

4. The mist humidifier of claim 1 wherein the heater mechanism is disposed in the first nebulization assembly and is selectively operable to heat the flow of mist particles.

5. The mist humidifier of claim 1 further comprising a fan adapted to blow the flow of mist particles from the first and second nebulization assemblies and from the humidifier.

6. The mist humidifier of claim 1 further comprising first and second fans adapted to blow the flow of mist particles from the first and second nebulization assemblies, respectively, and from the humidifier.

7. The mist humidifier of claim 6 wherein each of the nebulization assemblies also includes a flow chamber and an air supply line, the air supply line of the first nebulization assembly connecting the first fan to the flow chamber of the first nebulization assembly, the air supply line of the second nebulization assembly connecting the second fan to the flow chamber of the second nebulization assembly, the heater mechanism being disposed in the air supply line of the first nebulization assembly.

8. The mist humidifier of claim 1 further comprising:
   a porous tray positioned in the flow of mist particles; and
   a plurality of decorative rocks disposed on the tray.

9. The mist humidifier of claim 1 wherein the nebulization device is an ultra-sonic transducer.

10. The mist humidifier of claim 1 wherein the heater mechanism is a wire heater or a positive temperature coefficient (PTC) ceramic heater.

11. The mist humidifier of claim 10 wherein the heater mechanism has a variable heat output.

12. A mist humidifier comprising:
    a water supply adapted to provide a flow of water;
    at least one nebulization device adapted to nebulize at least a portion of the flow of water and discharge a flow of mist particles in a downstream direction; and
    at least one heater mechanism adapted to selectively heat at least a portion of the flow of mist particles;
    wherein the nebulization device has a plurality of nebulization locations or the humidifier includes a plurality of nebulization devices, the heater mechanism being positioned downstream of one of the nebulization locations or one of the nebulization devices, the humidifier further comprising a baffle disposed intermediate the heater mechanism and the one of the nebulization locations or the one of the nebulization devices.

13. The mist humidifier of claim 12 further comprising:
    a fan; and
    a flow chamber;
    wherein the nebulization device discharges the flow of mist particles into the flow chamber and the fan draws the flow of mist particles from the flow chamber, through the heater mechanism, and discharges the flow of mist particles from the humidifier.

14. The mist humidifier of claim 13 wherein the fan has a variable output.

15. The mist humidifier of claim 13 wherein the heater mechanism is selectively operable to heat the flow of mist particles.

16. The mist humidifier of claim 13 wherein the water supply comprises:
    a tank defining a primary water supply;
    a secondary water supply;
    a pump; and
    a supply line;
    wherein water is delivered from the primary water supply to the secondary water supply through the supply line by the pump and water is drawn from the secondary water supply by the nebulization device.

17. The mist humidifier of claim 16 wherein the water supply also comprises a recycle flow path adapted to carry water from the secondary water supply to the primary water supply.

18. The mist humidifier of claim 12 wherein the nebulization devices or the nebulization locations are positioned side-by-side and the heater mechanism and the baffle are disposed above the center nebulization device or the center nebulization location.

19. A mist humidifier comprising:
    a water supply adapted to provide a flow of water;
    a nebulization assembly, the nebulization assembly including at least one nebulization device and a flow chamber, the nebulization device being adapted to nebulize at least a portion of the flow of water and discharge a flow of mist particles in a downstream direction;
    a fan adapted to blow a supply air through the flow chamber;
    at least one heater mechanism adapted to selectively heat at least a portion of the flow of mist particles;
    an air heater mechanism adapted to heat the supply of air before the supply of air enters the flow chamber;
    a water chamber disposed in the flow chamber, the water chamber being adapted to hold a water supply having a surface;
    an air supply line; and
    a nozzle;
    wherein the air supply line connects the fan to the flow chamber and the nozzle directs the heated supply of air towards the surface of the water supply in the water chamber or across the surface of the water supply in the water chamber.

20. The mist humidifier of claim 19 wherein the water supply comprise:
    a tank defining a primary water supply; and
    a recycle flow path adapted to carry water from the water chamber to the primary water supply.

21. The mist humidifier of claim 20 wherein the water supply further comprises:
    a pump; and
    a supply line;

wherein water is pumped from the primary water supply through the supply line by the pump to a stream level disposed above the flow chamber, the water falling from the stream level into the water chamber.

* * * * *